United States Patent [19]

Shelton

[11] Patent Number: 4,682,757
[45] Date of Patent: Jul. 28, 1987

[54] SECONDARY BACKSEAT FOR GATE VALVE

[75] Inventor: William S. Shelton, Houston, Tex.

[73] Assignee: Joy Manufacturing Company, Pittsburgh, Pa.

[21] Appl. No.: 886,695

[22] Filed: Jul. 18, 1986

[51] Int. Cl.⁴ ............................................. F16K 41/14
[52] U.S. Cl. .................................... 251/77; 251/63.6; 251/330
[58] Field of Search ................. 251/330, 63.6, 77, 214

[56] References Cited

U.S. PATENT DOCUMENTS

| | | | |
|---|---|---|---|
| 855,385 | 5/1907 | Churchill | 251/330 X |
| 3,013,769 | 12/1961 | Volpin | 251/330 X |
| 3,896,835 | 7/1975 | Wicke | |
| 4,120,596 | 10/1978 | Kunkle | 251/330 X |
| 4,245,661 | 1/1981 | McGee | |
| 4,271,857 | 6/1981 | Rowe | |
| 4,307,745 | 12/1981 | McGee | |
| 4,474,203 | 10/1984 | Meyer | |
| 4,510,960 | 4/1985 | Jennings et al. | |

Primary Examiner—Arnold Rosenthal
Attorney, Agent, or Firm—David A. Warmbold

[57] ABSTRACT

A rising stem expanding gate valve including an improved metal-to-metal stem backseat seal assembly. An axially slidable seal ring is press fit onto the valve stem and is adapted to seal against a counterbored bonnet seat portion to provide a secondary metal-to-metal stem to bonnet seal. The seal ring is allowed to move a limited axial distance on the valve stem such that upon upward axial movement of the valve stem. The seal ring is repositioned in an axially downward direction about the valve stem and, consequently, is firmly sealed against the bonnet seat portion. Upon subsequent downward movement of the valve stem, the seal ring is repositioned in an axial upward direction about the valve stem such that the seal ring is in its original position about the valve by a repositioning means.

25 Claims, 6 Drawing Figures

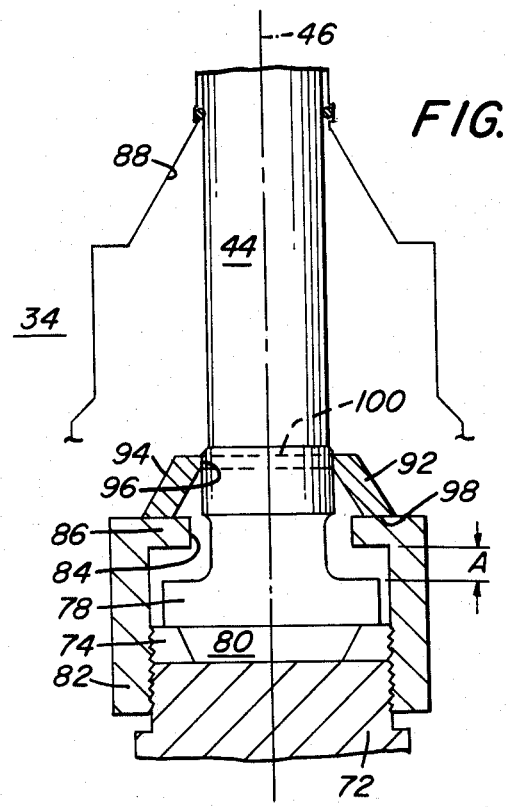
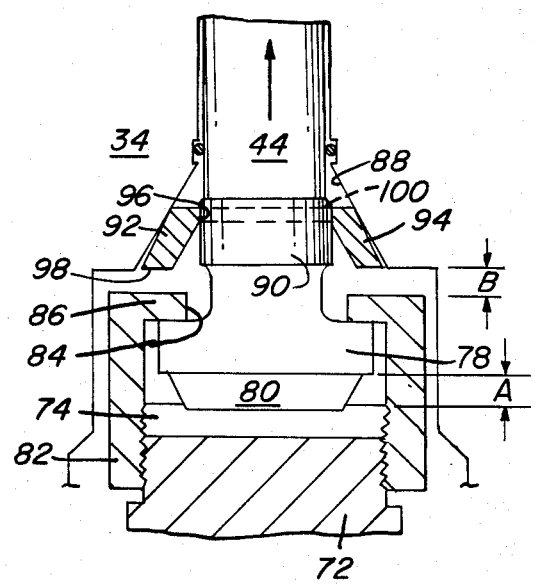
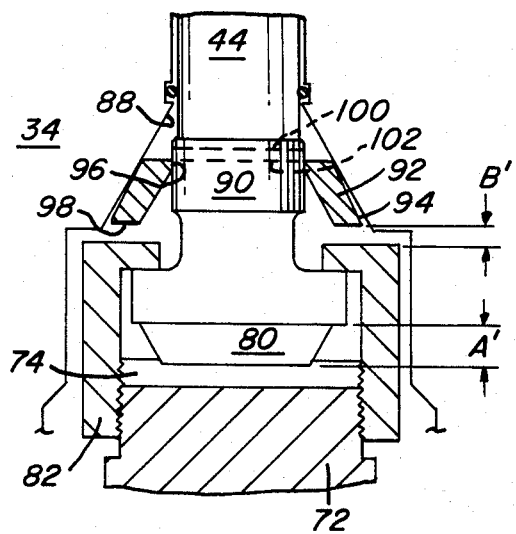

SECONDARY BACKSEAT FOR GATE VALVE

BACKGROUND OF THE INVENTION

1. Field of the Invention

The present invention relates to gate valves, and more particularly, is directed to a rising stem, expanding gate member type valve provided with a metal-to-metal backseat sealing ring to provide a secondary sealing function within the gate valve.

2. Description of the Prior Art

Heretofore, rising stem, expanding gate member type valves have not been provided with secondary metal-to-metal backseat seals. This type of valve usually only has a primary packing assembly provided in the bonnet assembly for sealing between the bonnet assembly and valve stem during normal operational pressures and temperatures. The metal-to-metal backseat sealing capability is desirable as a secondary sealing means which is placed in operation in the event of loss of the primary sealing means such as can occur through wear or during a fire situation. This secondary sealing capability is also useful when it is desired to replace or repair the primary packing assembly without removing the valve from its in-line position.

It is known in the art to provide other types of valves with secondary backseat capabilities. Backseats have been utilized in both rising stem slab gate and non-rising stem slab and expanding gate type valves For example U.S. Pat. No. 3,896,835 to Wicke discloses a rising stem slab gate type valve utilizing a secondary metal-to-metal backseat sealing member. The backseat provides a seal between the valve stem and bonnet assembly. In this type of valve the provision of a backseat seal can be easily accomplished by seating an upwardly facing circumferential abutment radially extending from the valve stem into a downwardly facing tapered recess in the bonnet assembly. When the valve stem and attached slab-type gate member are raised to the "up" position, the backseat seal is made up between the valve stem and bonnet assembly. However, this type of backseat sealing member will not work on a rising stem, expanding gate-type valve because the upward movement of the valve stem is stopped upon complete expansion of the expanding gate member contacting valve seats which surround the flow passages. Manufacturing tolerances make it difficult to determine the exact axial position of the valve stem upon complete expansion of the gate assembly such that an integrally formed backseat on the valve stem would not be guaranteed to contact the bonnet assembly to provide the secondary backseat sealing function.

In U.S. Pat. Nos. 4,289,157 and 4,307,745, both to J. McGee, a non-rising stem, expanding gate-type valve is shown provided with a secondary metal-to-metal backseat seal. This valve provides the secondary backseat seal upon the melting of a fusible material such as might occur during a fire situation. Upon melting of the fusible material, the valve stem is allowed to rise sufficiently to allow a backseat member provided integrally on the valve stem to seat within a recessed portion of the bonnet assembly. This type of backseat seal would also work on a non-rising stem, slab gate-type valve. The construction of the stem backseat seal here is the same as in the Wicke patent discussed above and for the same reasons would not work in a rising stem, expanding gate member valve.

It is, therefore, a primary object of this invention to provide a secondary metal-to-metal backseat sealing means for a rising stem, expanding gate-type valve.

It is another object of the invention to provide a secondary backseat sealing means which seals between the valve stem and bonnet assembly at both high and low internal pressures to prevent fluids existing within the valve chamber and flow passages from escaping to the outside atmosphere.

It is a further object of the invention to provide a pressure energized backseat sealing means such that the internal pressures existing in the valve chamber independently act on the sealing means and not on the valve stem for accomplishing a seal between the valve stem and bonnet assembly in the event the valve is exposed to an extremely high temperature or pressure condition and there is a failure of the primary valve stem packing.

It is a further object of the invention to provide a secondary backseat sealing means in a rising stem gate valve for quickly accomplishing a seal between the valve stem and bonnet assembly in the event the valve is exposed to an extremely high temperature or pressure condition such as may occur during an external fire situation.

It is a still further object of the invention to provide a gate valve having a fail-safe actuated gate assembly such that upon the occurrence of a fire situation the gate assembly will automatically close, or open as the case may be, allowing the secondary backseat sealing means to provide the necessary seal between the valve stem and bonnet assembly to isolate any internal fluids within the valve chamber of the gate valve.

SUMMARY OF THE INVENTION

The present invention includes an improved stem to bonnet backseat which can be utilized in a rising stem, expanding gate member type valve. The valve includes a valve body having a flow passage extending therethrough intersecting a valve chamber. An expanding gate assembly is slidably mounted within the valve chamber for movement between open and closed positions of the flow passages. A bonnet assembly having a central bore communicating with the valve chamber is secured to the valve body. A valve stem connected to the gate coaxially extends up through the central bore of the bonnet assembly. The valve stem is axially movable within the bonnet assembly to provide the movement of the gate assembly to open and close the flow passage through the valve. A spring loaded actuator is attached to the bonnet assembly to assist operation of the gate assembly.

The improved backseat sealing assembly includes a metal seal ring having a frusto-conical outer sealing surface. The seal ring is press-fit on the valve stem and positioned within the valve chamber. During operation of the valve, the seal ring is able to slide a limited axial distance upon the valve stem. The portion of the central bonnet bore opening into the valve chamber is counterbored to provide a tapered downwardly facing conically-shaped seating surface. The frusto-conical seal ring is dimensioned to fit within the counterbored portion of the bonnet assembly to provide a metal-to-metal seal between the valve stem and bonnet assembly when the valve stem is moved to its axially upward position. The sealing ring is slidable on the valve stem and has a first axial position such that upon upward axial movement of the valve stem initial contact is made between the seal ring and the bonnet seating surface. In response to further upward axial movement of the valve stem to properly seat the expanding gate assembly, the sealing ring is repositioned to a lower second axial position about the valve stem.

Since the seal ring is press-fit onto the valve stem, a certain amount of force is required to move the valve stem the further upward distance. This force is supplied by the actuator springs biasing the valve stem axially upward and the internal fluid pressure acting across the cross-sectional area of the gate assembly. The upward spring force and internal valve chamber pressures provide an initial load on the seal ring such that an initial low pressure metal-to-metal seal is obtained between the seal ring and bonnet assembly. As the pressure differential on either side of the seal ring increases, as may occur when the primary packing assembly springs a leak or is being removed for repair, the seal ring will become more highly loaded into sealing engagement with the bonnet assembly. In external fire conditions, extremely high pressure or temperature fluids exist in the valve chamber which would futher assist the backseating function of the seal ring to create a solid backseat seal between the bonnet assembly and valve stem.

The backseat sealing assembly also includes a repositioning means which acts to reposition the sealing ring from its second axial position to its original first axial position about the valve stem upon subsequent downward movement of the valve stem. Now, the sealing ring is again in position to provide a metal-to-metal seal with the bonnet seating surface upon subsequent upward movement of the valve stem.

The spring biased actuator provided is designed to fail-safe close the gate assembly of the gate valve upon loss of actuator fluid supply pressure. In a fire situation, the supply lines feeding the actuator would be destroyed, thereby disrupting the supply of fluid pressure to the actuator. The actuator's springs with the help of internal fluid pressure acting across the cross-sectional area of the stem and gate assembly will close the gate valve by quickly biasing the valve stem upwardly to move the gate assembly to its closed position blocking the fluid flow passages through the gate valve. The upward axial movement of the valve stem allows the backseat seal ring of the present invention to provide a metal-to-metal seal between the valve stem and bonnet assembly.

Many other objects and purposes of the invention will be made clear from the drawings and the detailed description of a preferred embodiment.

BRIEF DESCRIPTION OF THE DRAWINGS

In the accompanying drawings which form part of the specification and are to be read in connection therewith:

FIG. 4 is a further enlarged partial sectional view of the secondary metal-to metal stem to bonnet backseat seal shown with the valve stem in a position moving axially away from the bonnet assembly with the metal seal ring shown in its first axial position about the valve stem;

FIG. 5 is a view similar to that of FIG. 4, but the valve stem is shown in a position moving axially towards the bonnet assembly with the metal seal ring shown in the first axial position about the valve stem where intial contact with the bonnet assembly is made; and FIG. 6 is a view similar to that of FIG. 5, but the valve stem is shown in its upper position, after complete expansion of the gate assembly with the metal seal ring shown in its second axial position about the valve stem sealingly contacting the bonnet backseat portion.

DETAILED DESCRIPTION OF A PREFFERRED EMBODIMENT

Figure 1:
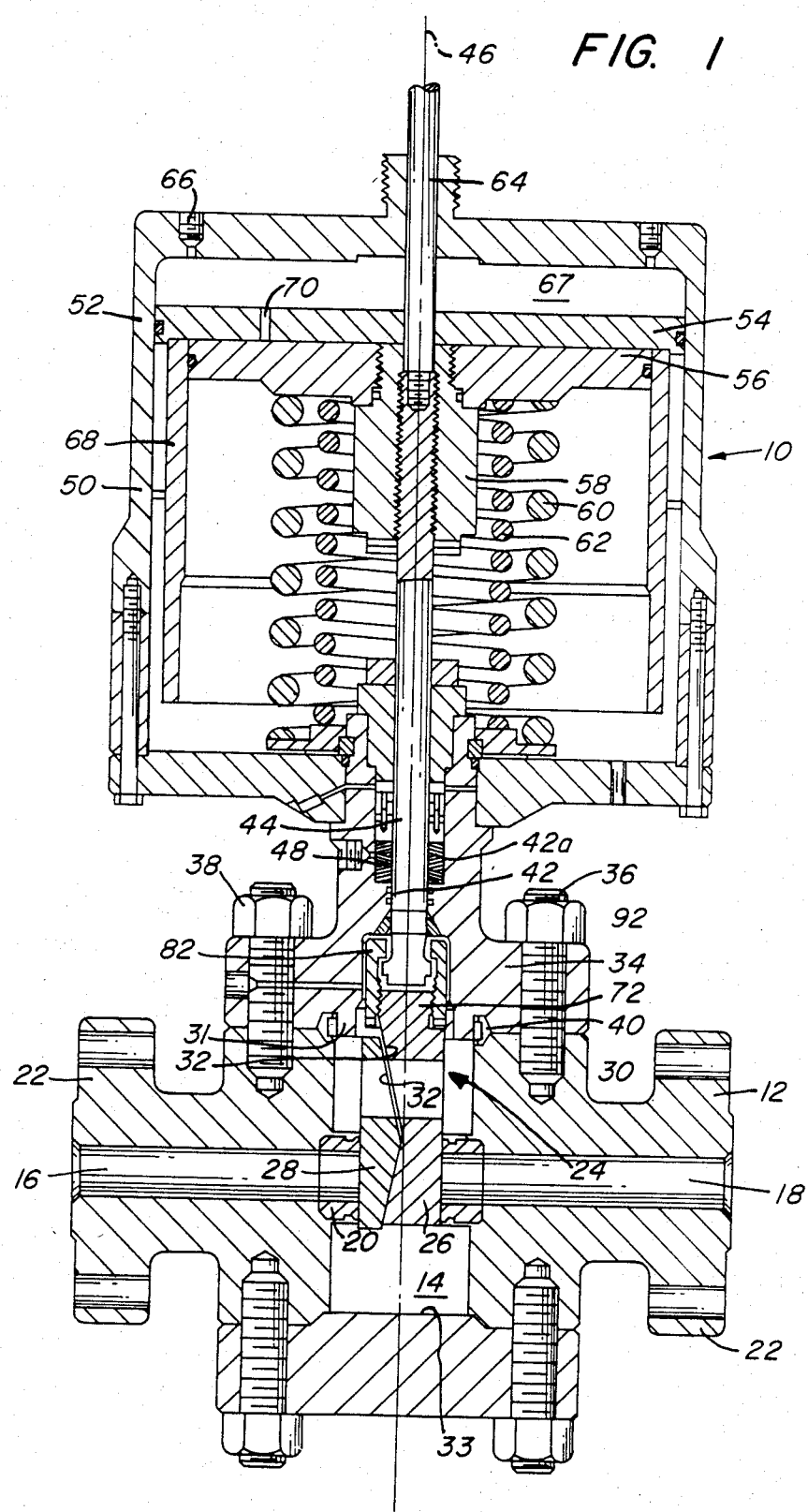
FIG. 1 is a vertical sectional view of an actuated rising stem, expanding gate-type valve utilizing the backseat sealing ring of the present invention.

Referring to the drawings and specifically FIG. 1, a rising stem, expanding gate-type valve utilizing a secondary backseat sealing means of the present invention is illustrated and indicated generally at 10. In the following description, it is to be understood that such terms as "lower", "downward", "upper", "upward," "inner" and "outer" are words or convenience and are not to be construed as limiting terms.

The valve structure 10 includes a valve body 12 having a valve chamber 14 therein. An inlet flow passage 16 and an outlet flow passage 18 communicate with valve chamber 14. A pair of valve seats 20 are mounted about each of flow passages 16 and 18 adjacent valve chamber 14. Flanges 22 on the ends of the valve body 12 may be suitably connected to a pipeline or other flow system as is well-known in the art.

Figure 3:
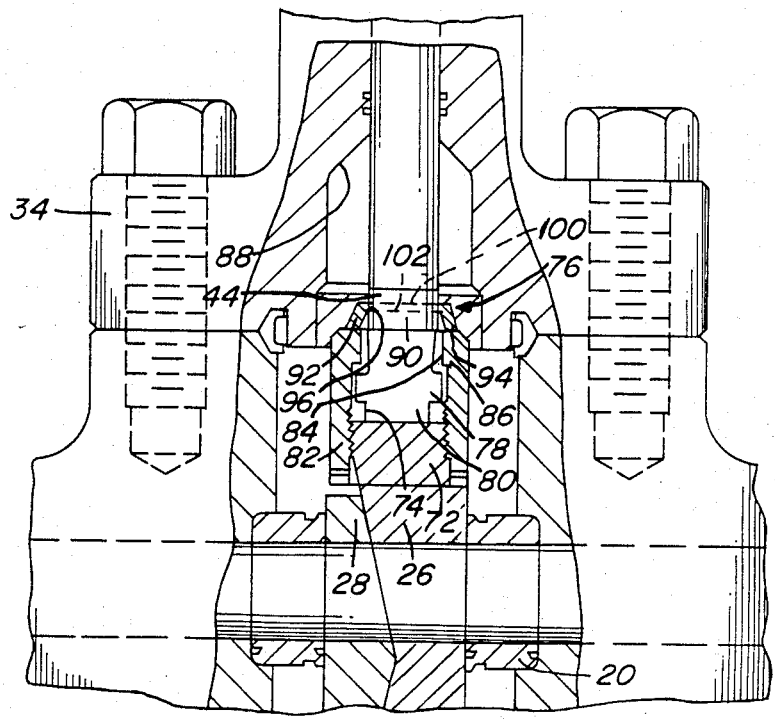
FIG. 3 is an enlarged fragmentary sectional view of the gate valve of FIG. 1, the backseat mechanism of the present invention is shown with the backseat sealing ring in a first position about the valve stem such that upon subsequent upwardly movement of the valve stem the sealing ring will contact the bonnet backseat surface.

An expanding gate assembly 24 is mounted in valve chamber 14 for movement between open and closed positions relative to flow passages 16 and 18. Gate assembly 24 includes a gate 26 and a segment 28 which cooperate with one another to expand and contract the gate assembly. In the open position of the gate assembly as shown in FIG. 3, gate 26 and segment 28 each having ports 30 cooperate to present a through passage which is aligned with flow passages 16 and 18 in order to permit fluid flow through the valve. When gate assembly 24 is moved upwardly to the closed position as shown in FIG. 1, ports 30 are offset from flow passages 16 and 18 and the gate assembly prevents flow through the valve. Gate 26 and segment 28 have adjacent inclined surfaces 32 which act against one another in camming fashion to expand gate assembly 24 firmly against valve seats 20 in both the fully open and fully closed positions of the valve. The valve includes upper and lower stops 31 and 33, respectively to prevent continued movement of the gate assembly upon reaching the upper and lower limits of the gate assembly travel. The segment 28 contacts stops 31 and 33 to expand the gate assembly to seal against the valve seats 20. The upper and lower limits of travel of the gate assembly and valve stem are reached upon segment 28 contacting stops 31 and 33 and expansion of the gate assembly. A collapsing mechanism is utilized to collapse gate assembly 24 away from seats 20 when the gate assembly is moving between the open and closed positions. Expanding gate assemblies are well-known in the art and further details need not be given here.

A bonnet assembly 34 is secured to the top of valve body 12 by studs 36 and nuts 38. A seal ring 40 provides a seal between body 12 and bonnet 34. The bonnet 34 has a central bore 42 therethrough having a longitudinal axis 46 which receives an elongated valve stem 44. A stem connection assembly, generally indicated at 45, is utilized to connect the gate assembly 24 to the valve stem 44. The details of the stem connection assembly 45 will be discussed in greater detail below.

A primary packing assembly is disposed in an enlarged bore portion 42a of the central bore. The primary packing assembly includes annular packing rings 48 which are disposed in the bore section 42a and compressed by packing retainer 50 to provide fluid-tight seal between the bonnet assembly 34 and the valve stem 44. The packing retainer 50 is threaded into the top of the enlarged bore portion 42a of the bonnet bore 42. The primary packing assembly shown is simply an example of one type of packing assembly which can be used. There may be many packing assemblies suitable for this purpose.

The valve stem 44 extends upwardly above bonnet assembly 34 into an actuator 51 having a cylindrical housing 52 which normally controls the operation of the gate assembly 24 as shown in FIG. 1. Generally, the actuator 50 includes a primary piston 54 and a secondary piston 56 which are normally disposed in abutting relation to each other such as when the actuator is in its relaxed condition. The secondary piston 56 is threaded onto the upper end of an adapter 58, which is, in turn, threadedly connected to the upper end of the valve stem 44. The secondary piston 56 is biased towards the upper end of the cylinder 52 by a pair of springs 60 and 62. The primary piston 54, which sits loosely atop the drive piston 56 is of a diameter corresponding substantially to the inner diameter of cylinder 52 providing a close-sliding fit therebetween. The primary piston 54 abuts the top of the adapter 58 and secondary piston 56 and receives a stem extension 64 therethrough. The stem extension 64 extends outwardly of the cylinder 52 to act as an external visual guide for determining the open or closed position of the gate assembly with respect to the flow passages.

A fluid pressure inlet 66 is provided in the top end of the actuator 50 communicating with a pressure chamber 67 created between the primary piston 54 and inside top end wall of cylinder 52. Inlet 66 is internally threaded for accommodating a connection to a fluid supply conduit (not shown) leading to a pneumatic fluid supply source for operating the actuator.

Affixed to the underside of the primary piston 54 is a cylindrical down-stop member 68. The secondary piston 56 is disposed in close fitting relation to the inner wall of the cylindrical down-stop 68 and is adapted for sliding motion therein. A small orifice 70 is provided in the primary piston 54 communicating to the secondary piston face 56 to allow the flow of actuator supply fluid to communicate between pressure chamber 67 and a second pressure chamber (not shown) provided between the primary and secondary pistons 54 and 56, respectively. The operational details of this actuator will be explained in greater detail below with respect to the present invention. Furthermore, the unique double piston actuator shown herein is more fully explained in U.S. Pat. No. 4,585,207 to Shelton and assigned to the same assignee as the present application and which is hereby incorporated by this reference in its entirety.

The stem connection assembly 45, as seen in FIGS. 2-6, cooperates with the secondary backseat sealing assembly of the present invention to provide a positive metal-to-metal seal between the valve stem 44 and bonnet assembly 34. The gate member 26 has an externally threaded extension 72 at its upper end with an internal elongated slot 74, formed in its uppermost end. The slot 74 is disposed in a generally parallel relationship with the longitudinal axis of the ports 30 and flow passages 16 and 18. The stem 44 also has an integrally formed extension 76 at its lower extremity which extends below bonnet assembly 34 into the valve chamber 14. The stem extension 76 has an enlarged diameter annular shoulder 78 thereon and an elongated key 80 depending from the bottom of the annular enlarged shoulder. The key 80 is disposed within the elongated slot 74 of the gate member extension 72 to provide a key-slot arrangement allowing the gate assembly 24 to shift relative to the stem 44 in a direction generally parallel with the longitudinal axis of the port 30 and flow passages 16 and 18 during expansion and retraction of the gate assembly.

A gate nut 82 is threaded onto gate extension 72 for connecting valve stem 44 to gate assembly 24. Gate nut 82 is internally threaded and has an opening 84 receiving therethrough the valve stem extension 76. Gate nut 82 has an inwardly extending annular abutment 86 which engages the top of annular shoulder 78 to secure the valve stem 44 within nut 82.

Referring to FIGS. 4-6, the internal portions of the stem connection assembly can be seen in greater detail. The inside axial dimension of the gate nut 82 as measured between the annular abutment 86 and the top of the gate extension 72 is larger than the axial dimension of the annular valve stem shoulder 78. This axial lost motion gap between the shoulder 78 and the respective parts of the gate nut 82 and gate extension 72 as seen in FIGS. 4 and 5 is generally denoted as gap "A" which can be seen both above and below shoulder 78 depending on which direction the valve stem is moving. The lost motion gap "A" allows the valve stem 44 to move a limited axial distance without corresponding axial movement of the gate assembly 24. The gaps "A" is critical to the present invention and will be explained in greater detail below.

In accordance with the present invention, a secondary backseat sealing ring 92 provides a positive metal-to-metal seal between the valve stem 44 and bonnet assembly 34 over a wide range of pressures and temperatures. Referring to FIGS. 4-6, the central bore 42 of the bonnet assembly 34 opens towards the valve chamber and is provided with a tapered (frusto-conical) seating surface 88 facing the valve chamber 14.

The valve stem 44 includes a backseat sealing surface 90 provided on the stem extension portion 76. The backseat sealing surface 90 has a predetermined axial dimension (i.e. 0.750 to 1.000 inches) and a uniform diameter and is positioned within the valve chamber 14. The backseat sealing surface 90 receives the backseat seal ring 92 about its outer circumference. The backseat stem seling surface 90 is provided with a relatively smooth surface such as 32 RMS which is typical for metal surfaces requiring metal-to-metal sealing.

Again, referring to FIGS. 4-6, the backseat seal ring 92 has an inner seal surface portion 96 having a relatively smooth surface such as 32 RMS, and is press-fit about the backseat stem sealing surface 90 to establish a metal-to-metal seal with the valve stem 44. The seal ring also has an outer tapered (frusto-conical) annular sealing surface 94 to establish a metal-to-metal seal with the tapered seating surface 88 of the bonnet assembly 34. The backseat seal ring 92 also has a bottom end 98. The backseat seal ring 92 is designed to be able to slide up and down a limited axial distance on the backseat sealing surface 90 of the valve stem while still providing a metal-to-metal seal therebetween.

There is an angular mismatch between the angles of taper of the bonnet seating surface 88 and the outer seal ring surface 94. Experience has shown that a one (1) degree mismatch between these two tapered surfaces 88 and 94 provide for a satisfactory line contact seal therebetween. Furthermore, experience has shown that a bonnet seating surface 88 having a twenty (20) degree angle of taper with respect to longitudinal axis 46 seals expectional well with a seal ring 92 having an outer seal surface 94 with a twenty-one (21) degree angle of taper with respect to longitudinal axis 46. However, other relationships may be made with respect to the angles of taper of these tapered surfaces 88 and 94 which work equally as well to those described above.

Referring to FIGS. 4-6, the backseat seal ring 92 maintains first and second axial positions 100 and 102, respectively, about the backseat stem sealing surface 90 of valve stem 44. The dotted lines 100 and 102 represent the top edge position of seal ring 92. The first axial position 100 is slightly above the second axial position 102 and during actuation of the gate valve the backseat seal ring 92 will move between these two positions. The distance between the first and second axial positions 100 and 102 can vary, however, it is important that this distance be less than the axial distance of gap "A". The exemplary embodiment shows an axial distance within a range of 0.125 to 0.500 inches which is considered optimal.

Figure 2:
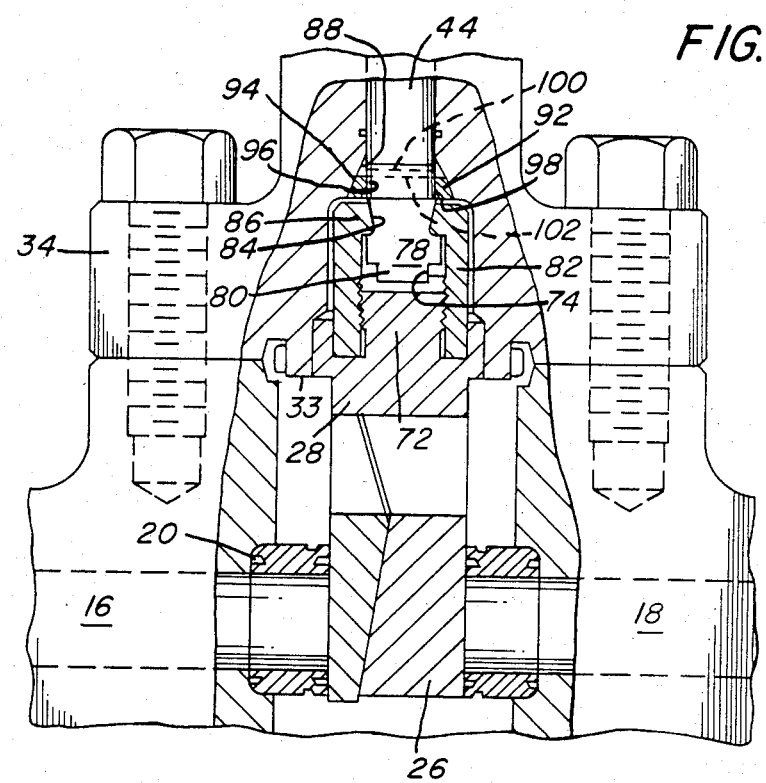
FIG. 2 is an enlarged fragmentary sectional view of the gate valve of FIG. 1, the backseat mechanism of the present invention shown with its backseat sealing ring in a second axial position about the valve stem wherein the sealing ring member is providing a metal-to-metal seal with the seating surface of the bonnet assembly and the gate member is in the closed position of the flow passages.

In FIGS. 3 and 4, the valve stem and gate assembly are shown in the downward position with the gate assembly port 30 open to the flow passages 16 and 18. Referring specifically to FIG. 4, the seal ring 92 is shown in the first axial position 100 about the valve stem 44. Upon subsequent upward movement of the valve stem 44, as shown in FIG. 5, the valve stem 44 will move upward the distance of axial gap "A" before the gate assembly 24 begins upward movement. This allows the seal ring 92, which is held snugly about the valve stem 44, to move axially away from the top of the gate nut abutment 86 by the distance of gap "B" before subsequent upward axial movement of the gate nut 82 and gate assembly 24 Gap "B" is equal to the gap "A". As shown in FIGS. 2 & 5, the seal ring 92 contacts the bonnet seating surface 88 before the gate segment 28 contacts stop 31. Upon continued upward movement of the valve stem 44 to have segment 28 contact stop 31, the seal ring 92 is repositioned from the first axial position 100 to a lower second axial position 102 about the valve stem 44. The distance between the bottom end 98 of seal ring 92 when in the second axial position 102 and the top of gate nut 82 is less than the axial distance of gap "B" and as seen in FIG. 6, is designed as gap "B'". The axial distance of gap "B'" is also smaller than the axial distance of gap "A". The upward and downward limits of the valve stem 44 and gate assembly 24 are determined by the upper and lower stops 31 and 33, segment 28 of gate assembly 24 contacts stops 31 and 33 to act on the segment 28 of gate assembly 24 to expand gate 26 and segment 28. Upon prevention of the gate assembly, further axial movement of the valve stem 44 stopped.

In FIGS. 2 and 6 the seal ring 92 is shown in the second axial position 102 about valve stem 44. The valve stem 44 is shown in its upper position with the gate assembly blocking the flow passages 16 and 18. Referring specifically to FIG. 6, the axial gap "A" is shown between the bottom of annular shoulder 78 and the top of gate extension 72. The gap "B'" is shown between the bottom surface 98 of seal ring 92 and the top surface of gate nut 82. Since gap "B'" is smaller than axial gap "A", when valve stem 44 moves downward as shown in FIG. 4, the top surface of gate nut abutment 86 will contact the bottom end 98 of seal ring 92 before the annular valve stem shoulder 78 contacts the top of gate extension 72. Continued downward movement of the valve stem allows the top surface of gate nut abutment 86 to reposition the seal ring 92 from the second axial position 102 back to the first axial position 100 about the valve stem 44.

OPERATION

As shown in FIG. 1, the gate valve of the present invention is shown with the valve stem 44 biased towards its position by actuator springs 60 and 62. The gate assembly 24 is shown blocking flow passages 16 and 18 and segment 28 is contacting stop 1 and the gate asembly is in the expanded condition sealing against valve seats 20. Referring to FIGS. 2 and 6, the backseat seal ring 92 is shown in the second axial position 102 about valve stem 44 providing a low-pressure seal between the valve stem 44 and bonnet seating surface 88. During normal operation of the gate valve and actuator, pressurized pneumatic actuator fluid is admitted to pressure chamber 67 through inlet 66 to move the primary and secondary pistons 54 and 56 and valve stem 44 downwardly to collapse the expanded gate assembly 24. In expanding gate valves, this initial gate assembly movement requires a large initial force to move the expanded gate assembly from its expanded condition to a collapsed condition. Therefore, the primary piston 54 has a large square-inch area pressure surface which allows sufficient downward force to be directed onto the valve stem 44 to bias valve stem 44 downwardly to collapse gate assembly 24. Once this has occurred, the primary piston downstop 68 contacts the bottom end of the actuator cylinder 52. The pressurized actuator fluid then passes through the small orifice 70 and enters a secondary pressure chamber (not shown) between primary and secondary pistons 54 and 56, respectively, to further bias secondary piston 56 and valve stem 44 downwardly to complete the downward movement of the valve stem 44 and to position the ports 30 in gate assembly 24 to open a fluid conduit through the gate valve 10.

Referring to FIG. 6, the distance between seal ring 92 and gate nut 82, designated as gap "B'" is smaller than gap "A" within the stem connection assembly. Therefore, as valve stem 44 moves downwardly, the bottom end 98 of seal ring 92 will contact the gate nut 82 before the lost motion gap "A" is closed. Upon continued downward movement of valve stem 44 to close gap "A", the gate nut 82 will reposition seal ring 92 on the stem backseat sealing surface 90 from the second axial position 102 to the first axial position 100 about the valve stem 44, as shown in FIG. 4. The lost motion gap "A" is now shown above annular stem shoulder 78.

Upon release of the pressurized actuator fluid, as may occur during normal valve operation when closing the gate valve or during a fire situation where the intense heat has destroyed the actuator fluid supply lines, the springs 60 and 62 and any internal fluid pressure acting on the gate assembly will bias the pistons 54 and 56, valve stem 44, and gate assembly 24 from the open position of the valve as shown in FIG. 3 to the closed position of the valve as shown in FIGS. 1 and 2.

Referring to FIG. 5, it is seen that the valve stem 44 moves upwardly the distance of lost motion gap "A" before the gate assembly 24 begins to rise with it. The seal ring 92 rides up with the valve stem 44 and the axial distance between the bottom end 98 of seal ring 92 and gate nut 82 is shown as gap "B" which is equal in distance to gap "A". When the outer seal surface 94 of seal ring 92 contacts the bonnet seating surface 88, the gate segment 28 has not yet reached the upper stop 31 (see FIG. 2). Upon continued upward movement of the valve stem 44 to where segment 28 contacts stop 31, the seal ring 92 is pushed from its first axial position 100 about valve stem 44 to the second axial position 102. Seal ring 92 is press-fit onto the stem backseat sealing surface 90 and, therefore, the continued upward movement of valve stem 44 creates a load force on seal ring 92. This load force pushes the seal ring 92 into the bonnet seating surface 88 to create an initial low pressure metal-to-metal seat therebetween.

During normal valve operations, the primary packing ring assembly 48 provides the necessary seal between the valve stem 44 and bonnet assembly 34 to prevent pressurized fluid existing in the valve chamber 14 from escaping exteriorly of the gate valve 10. However, upon the occurrence of a leak in the primary packing ring assembly 48, such as might occur after normal wear and tear or during a fire situation, there will occur a pressure drop across seal ring 92. Initially, the low pressure seal created by the valve stem load force on the seal ring 92 provides the low presure metal-to-metal seal between the valve stem and bonnet assembly. However, as the pressure differential across the seal ring increases, the pressure-energized seal will press with greater force into the bonnet seating surface 88 to affect a tighter metal-to-metal backseat seal between the valve stem 44 and bonnet assembly.

Many valves of this type also include a eutectic substance designed to melt upon application of intense heat to then allow axial movement of the valve stem to provide the secondary backseat seal during a fire sitation. Such a eutectic could also be utilized with the present invention to insure that the valve stem 44 would move axially upward upon being subjected to the intense heat of a fire situation. U.S. Pat. No. 3,896,835 to Wicke shows the use of such a eutectic device in an actuated, rising stem, slab gate-type valve. Such a eutectic device would work equally as well in the present invention to guarantee upward movement of the valve stem and gate assembly to close the gate assembly and provide the secondary backseat seal during a fire situation.

It will, therefore, be seen that a unique secondary backseat seal ring assembly for rising stem, expanding gate-type valves is herein provided which accomplishes a metal-to-metal seal between the valve stem and bonnet assembly upon upward axial movement of the valve stem. The backseat seal ring assembly provides a metal-to-metal seal between the valve stem and bonnet assembly whenever the primary packing assembly leaks or is destroyed such as may occur during a fire situation.

It is also to be understood that the foregoing description of a preferred embodiment of the invention has been presented for purposes of illustration and description and is not intended to limit the invention to the precise form discussed. For example, any type actuator or handwheel device could be utilized that would adequately provide axial movement of a valve stem to operate an expanding-type gate assembly. Furthermore, the present invention would work as well on valves utilizing slab gate-type gate assemblies as expanding gate-type valves as shown herein. Also, the angles of taper of the respective backseat seal ring and bonnet backseat surface need not be restricted to the frusto-conical configuration, although such is preferred. It is to be appreciated, therefore, that changes in details of the illustrated construction may be made by these skilled in the art, within the scope of the appended claims, without departing from the spirit of the invention.

What is claimed is:

1. A gate valve comprising:
   a valve body having a flow passage extending therethrough and a valve chamber intersected by the flow passage;
   a valve closure element slideably mounted within the valve chamber for movement between open and closed positions relative to the flow passages;
   a bonnet assembly secured to said valve body having a central bore communicating with the valve chamber, the central bore having a longitudinal axis and a coaxial frusto-conical counterbore portion adjacent the valve chamber providing a bonnet backseat surface;
   a valve stem connected to said valve closure element and extending coaxially through the central bore of said bonnet assembly, said valve stem being axially movable to move for said slideably-mounted valve closure element between open and closed positions of the fluid flow passages of the gate valve;
   means for backseating said valve stem on the bonnet backseat surface in response to axial movement of said valve stem, said backseating means including a metal seal ring having a frusto-conical outer sealing surface, the metal seal ring being slideably mounted on said valve stem within the valve chamber, the slideable seal ring having a first axial position on said valve stem whereby initial contact is made between the seal member and said bonnet backseat portion in response to axial movement of said valve stem, the slideable seal ring being movable to a second axial position on said valve stem in response to further axial movement of said valve stem to establish a metal-to-metal seal between said valve stem and said bonnet assembly; and
   means for repositioning the metal seal ring from the second axial position to the first axial position about said valve stem in response to opposite axial movement of said valve stem.

2. A gate valve according to claim 1 wherein said repositioning means comprises a lost motion connection between said valve stem and said valve closure assembly allowing relative movement therebetween to move the frusto-conical seal ring from the second axial position to the first axial position about said valve stem.

3. A gate valve according to claim 2 where said lost motion connection comprises:
   an enlarged diameter valve stem portion formed on the end of said valve stem extending into said valve chamber, said stem portion having a predetermined axial dimension; and an inverted cup-shaped gate nut having its open end threaded onto the end of said valve closure element forming a chamber therebetween having a predetermined internal axial dimension, said gate nut having a bore in its closed end being coaxial to and receiving said valve stem therethrough, the chamber receiving a portion of said valve stem therein including said enlarged diameter stem portion thereof, the coaxial bore having a diameter slightly larger than the diameter of the valve stem and smaller than the diameter of the enlarged valve stem portion, the predetermined axial dimension of said enlarged diameter valve stem portion being smaller than the predetermined internal axial dimension of the chamber so that the valve stem is allowed relative longitudinal movement with respect to said gate nut and valve closure element.

4. A gate valve of claim 1 including a valve seat surrounding each of said flow passages and positioned adjacent said valve chamber.

5. A gate valve of claim 4 wherein said valve closure element comprises an expansible ported gate assembly mounted for rectillinear movement between said valve seats to open and close the valve, the gate assembly having two ported abutting members having generally parallel outer sealing faces to engage the valve seats and complementary opposed inner faces, each formed with at least one surface portion that is inclined with respect to said valve seats to form at least one set of wedging surfaces effective to expand said assembly normally of said valve seats and force said members oppositely into sealing engagement therewith upon relative displacement between said members in one direction parallel to the movement of said assembly.

6. A gate valve of claim 1 wherein there is an angular mismatch between the respective angles of taper of the bonnet backseat surface and the frusto-conical outer sealing surface of said metal seal ring.

7. A gate valve of claim 1, wherein the angle of taper of the bonnet backseat surface is less than the angle of taper of the outer sealing surface of said metal ring.

8. A gate valve of claim 6, wherein the angle of taper of the bonnet backseat surface with respect to the longitudinal axis of said bore is twenty (20) degrees.

9. A gate valve of claim 8, wherein the angle of taper of the outer sealing surface of said metal ring is twenty-one (21) degrees.

10. A gate valve of claim 6, wherein the angular mismatch between the respective angles of taper of the bonnet backseat surface and the frusto-conical outer sealing surface of said metal seal ring is one (1) degree.

11. A gate valve of claim 1, wherein said valve stem has a polished backseat seal surface having a predetermined axial height and uniform diameter and being positioned within said valve chamber for closely receiving the metal seal ring thereabout in coaxial relation.

12. A gate valve of claim 11, where the metal seal ring is press fit onto the backseat seal surface of said valve stem such that limited relative axial movement between the metal ring and valve stem is allowed in response to longitudinal movement of said valve stem.

13. A gate valve of claim 1, further comprising means for providing axial movement of said valve stem, said actuator means being supplied with a supply fluid to move said valve stem and valve closure element axially downward, said actuator means having a spring therein to move said valve stem and valve closure element axially upward upon venting of the supply fluid from said actuator means.

14. An expanding gate valve comprising:
a valve body having a flow passage extending therethrough and a valve chamber intersected by the flow passage;
a pair of valve seats, one valve seat surrounding each of the flow passages adjacent the intersection of the valve chamber;
an expandable gate assembly element slideably mounted within the valve chamber for movement in a collapsed condition between open and closed positions relative to the flow passages, said gate assembly including a gate member and a segment which are expanded away from each other at the open and closed positions and are provided with ports which are aligned with one another and the flow passages in the open position, said gate member and segment being each provided with an outer sealing surface for sealing against said valve seats when the gate assembly is expanded in the open and closed positions;
a bonnet assembly secured to said valve body having a central bore communicating with the valve chamber, the central bore having a longitudinal axis and a coaxial frusto-conical counterbore portion adjacent the valve chamber providing a bonnet backseat surface;
a valve stem connected to said gate assembly element and extending coaxially through the central bore of said bonnet assembly, said valve stem being axially movable to move for said gate assembly between open and closed positions of the fluid flow passages of the gate valve;
means for backseating said valve stem on the bonnet backseat surface in response to axial movement of said valve stem, said backseating means including a metal seal ring having a outer sealing surface, the metal seal ring being slideably mounted on said valve stem within the valve chamber, the slideable seal ring having a first axial position on said valve stem whereby initial contact is made between the seal ring and said bonnet backseat portion in response to axial movement of said valve stem, the slideable seal ring being movable to a second axial position on said valve stem in response to further axial movement of said valve stem to establish a metal-to-metal seal between said valve stem and said bonnet assembly; and
means for repositioning the metal seal ring from the second axial position to the first axial position about said valve stem in response to opposite axial movement of said valve stem.

15. A gate valve according to claim 14 wherein said repositioning means comprises a lost motion connection between said valve stem and said expanding gate assembly allowing relative movement therebetween to move the frusto-conical seal ring from the second axial position to the first axial position about said valve stem.

16. A gate valve according to claim 15 where said lost motion connection comprises:
an enlarged diameter valve stem portion formed on the end of said valve stem extending into said valve chamber, said stem portion having a predetermined axial dimension; and
an inverted cup-shaped gate nut having its open end threaded onto the end of said gate assembly forming a chamber therebetween having a predetermined internal axial dimension, said gate nut having a bore in its closed end being coaxial to and receiving said valve stem therethrough, the chamber receiving a portion of said valve stem therein including said enlarged diameter stem portion thereof, the coaxial bore having a diameter slightly larger than the diameter of the valve stem and smaller than the diameter of the enlarged valve stem portion, the predetermined axial dimension of said enlarged diameter valve stem portion being smaller than the predetermined internal axial dimension of the chamber so that the valve stem is allowed relative longitudinal movement with respect to said gate nut and expanding gate assembly.

17. A gate valve of claim 14, wherein there is an angular mismatch between the respective angles of taper of the bonnet backseat surface and the frusto-conical outer sealing surface of said metal seal ring.

18. A gate valve of claim 14, wherein the angle of taper of the bonnet backseat surface is less than the angle of taper of the outer sealing surface of said metal ring.

19. A gate valve of claim 17, wherein the angle of taper of the bonnet backseat surface with respect to the longitudinal axis of said bore is twenty (20) degrees.

20. A gate valve of claim 19, wherein the angle of taper of the outer sealing surface of said metal ring is twenty-one (21) degrees.

21. A gate valve of claim 17, wherein the angular mismatch between the respective angles of taper of the bonnet backseat surface and the frusto-conical outer sealing surface of said metal seal ring is one (1) degree.

22. A gate valve of claim 14, wherein said valve stem has a polished backseat seal surface having a predetermined axial height and uniform diameter adjacent the enlarged diameter valve stem portion and being positioned within said valve chamber for closely receiving the metal seal ring thereabout in coaxial relation.

23. A gate valve of claim 22, where the metal seal ring is press fit onto the backseat seal surface of said valve stem such that limited relative axial movement between the metal ring and valve stem is allowed in response to longitudinal movement of said valve stem.

24. A gate valve of claim 14, further comprising means for providing axial movement of said valve stem, said actuator means being supplied with a supply fluid to move said valve stem and valve closure element axially downward, said actuator means having a spring therein to move said valve stem and valve closure element axially upward upon venting of the supply fluid from said actuator means.

25. An improved gate valve of the type having a valve body with a flow passage extending therethrough and a valve chamber intersected by the flow passage; a valve closure element positioned in the valve chamber to control fluid flow through the gate valve; a bonnet assembly secured to the valve body and having a central bore communicating with the valve chamber; the central bore having a frusto-conical counterbore portion adjacent and facing the valve chamber; a valve stem connected to the valve closure element; wherein the improvement comprises:

means for backseating said valve stem on the bonnet backseat surface in response to axial movement of said valve stem, said backseating means including a metal seal ring having a outer sealing surface the metal seal ring being slideably mounted on said valve stem within the valve chamber, the slideable seal ring having a first axial position on said valve stem whereby initial contact is made between the seal ring and said bonnet backseat portion in response to axial movement of said valve stem, the slideable seal ring being movable to a second axial position on said valve stem in response to further axial movement of said valve stem to establish a metal-to-metal seal between said valve stem and said bonnet assembly; and means for repositioning the metal seal ring from the second axial position to the first axial position about said valve stem in response to opposite axial movement of said valve stem.

* * * * *